June 9, 1959 — A. B. RAY ET AL — 2,890,434
ELECTRICAL DISCONNECT SAFETY LOCK
Filed Oct. 21, 1955
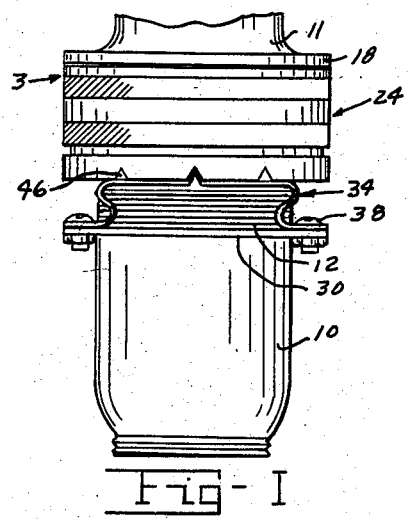
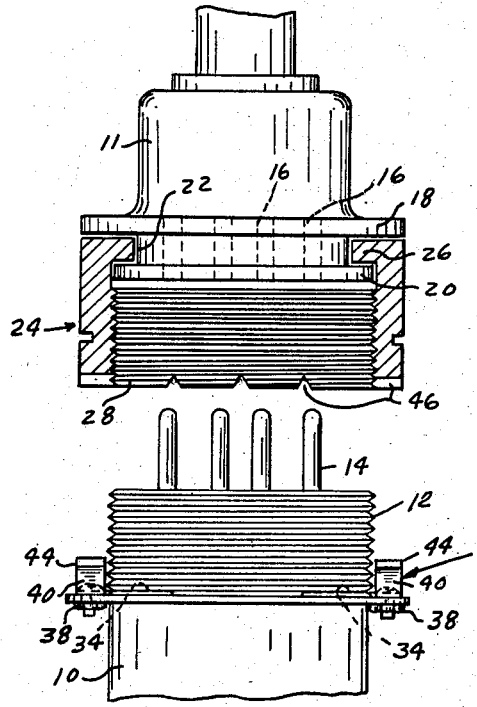
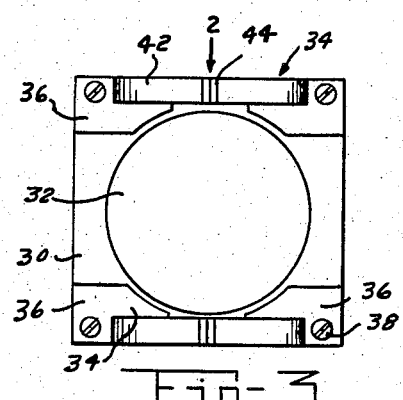
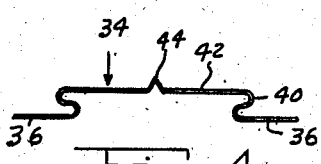
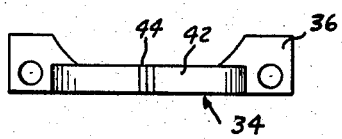
INVENTORS
ANATOLY B. RAY
BERNARD R. HARMON
BY Wade Koontz
Ruth Codier
ATTORNEYS United States Patent Office 2,890,434
Patented June 9, 1959

2,890,434

ELECTRICAL DISCONNECT SAFETY LOCK

Anatoly B. Ray and Bernard R. Harmon, Sacramento, Calif.

Application October 21, 1955, Serial No. 542,121

2 Claims. (Cl. 339—91)

(Granted under Title 35, U.S. Code (1952), sec. 266)

The invention described herein may be manufactured and used by or for the United States Government for governmental purposes without payment to us of any royalty thereon.

This invention relates to electrical disconnect safety lock, and more particularly to a locking device for securing electrical coupling connections in locations where access is difficult such as the various electrical installations in airplanes.

In the common use of electrical connectors in airplanes and like locations the conditions of use include much jarring vibration and shock. Under these conditions the couplings work loose and portions of the installation may become disconnected with the resulting interference with the operation of machinery or equipment.

Many locking devices have been used to overcome this difficulty. Most of these are positive one way locking devices which make disconnection very inconvenient or impossible, even when such disconnection is desirable and necessary for the replacement of parts or changes in design or equipment or plan of the installation.

The present invention has for its object the provision of a simple locking device for a pair of complemental coupling members which makes the connection positive and secure and insures against accidental displacement or disconnection and still makes provision for easy and convenient disconnection when such is desired without damage to the equipment or the locking means.

A further object of the invention is to obviate the complicated permanent locking devices which are now in use and to provide by a very simple, inexpensive, easily installed locking device or attachment a means for making and securing an electrical connection between two coupling members without at the same time making the connection permanent.

Other objects and advantages will become apparent from the following description and accompanying drawing in which like reference characters refer to like parts on the several figures.

Fig. 1 is a side elevational view of the coupling device in coupled condition with the locking means operative;

Fig. 2 is an exploded, slightly enlarged view of the device showing the main connecting element in cross section;

Fig. 3 is a top plan view of the locking device;

Fig. 4 is a side elevational view of one of the spring locking devices per se;

Fig. 5 is a top plan view of one of the spring locking devices per se.

Referring more particularly to the drawings, 10 and 11 are electrical cable or other conductor carrying members between which a releasable locking connection is desired. The member 10 is provided with an external screw threaded portion 12 and a plurality of projecting contact pins 14. These pins are complementary to and insertable in the sockets 16 in the member 11. The invention is not limited to this specific form of connection since the locking device later described may be utilized on other types of electrical connections. The member 11 is provided with a pair of spaced annular shoulders 18 and 20 which form an annular groove 22. A sleeve 24 is provided with an inwardly directed shoulder 26 fitting into the annular groove 22, and allowing free rotation of the sleeve 24 relative to the member 11. The sleeve 24 is provided with an internal screw thread 28 which is complementary to and engageable with the screw threads of the portion 12. A plate 30 is provided with a circular opening 32. This plate is cast with, or otherwise secured to the element 10. Its width exceeds the circumference of the members 10 and 11 so that a protruding ledge or flange is formed. A locking device is provided as follows: A pair of resilient strips 34 are secured at both ends of each to the plate 30 by any suitable means. The means shown consist of coinciding openings in the members 34 and the plate 30 and a screw and bolt connection 38. The locking devices are resilient metal straps, each provided with wing connecting portions or ears 36, a pair of S-shaped portions 40, a level, offset portion 42 and a V-shaped upwardly extending resilient detent 44 placed at the mid area of the portion 42. The sleeve member 24 is provided at its engaging edge with a series of inverted V-shaped indentations 46, complementary in form to the spring detents 44.

The operation of the device will now be evident. By means of the freely rotating sleeve member 24 connection is made between the members 10 and 11 by relative axial motion and the contact pins enter the complementary sockets 16. As the sleeve 24 proceeds downwardly engagement is made between the detents 44 of the spring locking device 34 and the indentations 46 on the member 11. Since there is a plurality of indentations 46 distributed around the circumference of the sleeve 24, varying degrees of tightness can be secured as detents 44 slip into and out of indentations 46 until a desired degree of tightness is obtained.

It will be seen that disconnection can be achieved by the same process in reverse. While the connection is held firmly and is sufficiently secure to endure the shocks and wear to which it is subjected in use, it can be disconnected when disconnection is desired.

For purposes of exemplification, particular embodiments of the invention have been shown and described according to the best present understanding thereof. However, it will be apparent that many changes and modifications in the arrangement and construction of the parts thereof may be resorted to without departing from the true spirit and scope of the invention.

We claim:

1. An electrical disconnect shock absorbing safety lock for connecting a pair of cable carrying members of the elongated prong and small diameter deep socket type, said lock comprising means on said cable carrying members for slidably effecting electrical contact, a rotatable collar on one of said members provided with a series of radially extending indentations, smooth uninterrupted areas on said collar between said indentations, an elongated resilient strip attached at both of its ends to the other of said cable carrying members, S-shaped portions adjacent the ends of said metal strip, an offset mid portion connecting said S-shaped portions and providing an extended substantially level area, a resilient detent on said mid portion formed by transverse bends in said strip, said detent having transverse extent and successively contacting the indentations in said sleeve, said mid portion providing an extended contact area between said strip and said sleeve.

2. An electrical disconnect safety shock absorbing lock for a sliding electrical connection between two cable carrying members, one of said members having a rotary sleeve, said lock comprising, a pair of elongated resilient strips, each strip comprising a pair of end ears fastened to one of said cable carrying members, S-shaped portions adjacent said ears, a substantially level offset mid portion connecting said S-shaped portions, transverse creases in said mid portion forming a resilient detent extending transversely on said mid portion, said rotating sleeve being provided with notches for successively engaging said detent, and extended contact areas between the mid portion of said strip and said sleeve, located on either side of said detent.

References Cited in the file of this patent

UNITED STATES PATENTS

| | | |
|---|---|---|
| 1,139,819 | Smith | May 18, 1915 |
| 1,573,328 | Sale | Feb. 16, 1926 |
| 2,355,166 | Johanson | Aug. 8, 1944 |
| 2,430,606 | Franz | Nov. 11, 1947 |
| 2,491,406 | Zeeb | Dec. 13, 1949 |
| 2,728,895 | Quackenbush et al. | Dec. 27, 1955 |
| 2,784,385 | Ennis | Mar. 5, 1957 |

FOREIGN PATENTS

| | | |
|---|---|---|
| 522,919 | Germany | Apr. 16, 1931 |